United States Patent [19]

Leo

[11] 4,320,884
[45] Mar. 23, 1982

[54] TRIPOD ARM

[76] Inventor: Bengt Leo, Gärdesvägen 1, S-730 40 Kolbäck, Sweden

[21] Appl. No.: 127,314

[22] Filed: Mar. 5, 1980

[30] Foreign Application Priority Data

Mar. 5, 1979 [SE] Sweden .................................. 7901941

[51] Int. Cl.³ .............................................. E04G 3/00
[52] U.S. Cl. ...................................... 248/276; 248/181
[58] Field of Search ................ 248/181, 276, 183, 275

[56] References Cited

U.S. PATENT DOCUMENTS 2,703,691  3/1955  Minnis ........................... 248/181 UX
3,211,405 10/1965  Fey et al. ............................ 248/183

Primary Examiner—Ronald Feldbaum
Attorney, Agent, or Firm—Toren, McGeady & Stanger

[57] ABSTRACT

An adjustable arm for mounting an article on a tripod which is composed of first and second arms connected by an interposed joint member, said joint member having two halves pivotally arranged adjacent one another on a common axle, one end of each of the first and second arms being attached to and extending from each of said halves, respectively, connecting means at the unattached ends of each of the arms for adjustably connecting each of the arms to an article and a tripod, respectively, means for pivotally positioning said joint halves and the attached arms about the axle and means for locking each of the connecting means and the joint halves in a fixed position.

9 Claims, 4 Drawing Figures

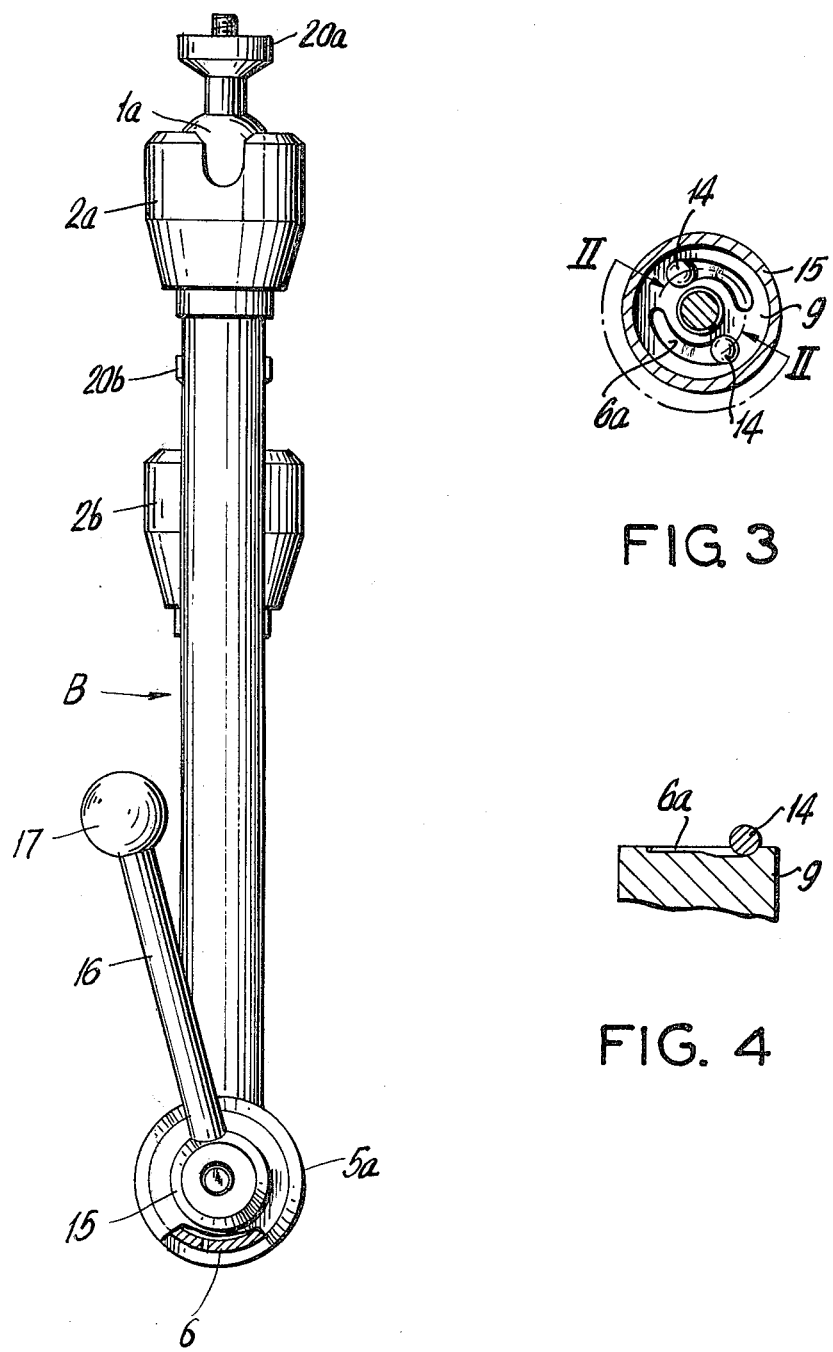

TRIPOD ARM

BACKGROUND OF THE INVENTION

1. Field of the Invention

The present invention relates to an adjustable arm for mounting on a tripod and particularly adjusting the position of relatively heavy objects, such as, measuring devices, machining tools, and cameras attached thereto.

2. Description of the Prior Art

Heretofore, it had not been possible to move relatively heavy objects, for example, a camera, quickly into the desired position within a usually very narrow range, as in the case of close-range photography and macrophotography or when taking worm's eye view pictures, and to fix the joints of the tripod arm in this position with a single manipulation.

In order to solve this problem, many different type arms have been suggested which, in certain cases and particularly for especially light objects, have resulted in practical instruments, such as, the instrument described in Swedish Patent No. 186,521. Additional proposals for tripod arms have been made which, however, are not yet available on the market, but have as their purpose the solution of the above-noted problem.

SUMMARY OF THE INVENTION

I have discovered an adjustable arm for mounting on a tripod which allows the operator to fix the angle of the article, e.g., a camera and the position of the arm at the point of attachment to the tripod with a single manipulation. This allows one hand to be free to position the arm and/or camera, and further allows repositioning to be easily and quickly accomplished.

More particularly, the device of the present invention is composed of first and second arms connected by an interposed joint member, said joint member having two halves pivotally arranged adjacent one another on a common axle, one end of each of the first and second arms being attached to and extending from each of said halves, respectively;

connecting means at the unattached ends of each of the arms for adjustably connecting each of the arms to an article and a tripod, respectively;

means for pivotally positioning said joint halves and the attached arms about the axle and means for locking each of the connecting means and the joint halves in a fixed position.

BRIEF DESCRIPTION OF THE DRAWINGS

FIG. 2 is a side view with the locking ring exposed.

FIG. 3 is a section taken through the spherical surfaces, and

FIG. 4 is a section taken perpendicularly of the section of FIG. 3.

DESCRIPTION OF THE PREFERRED EMBODIMENT

Figure 1:
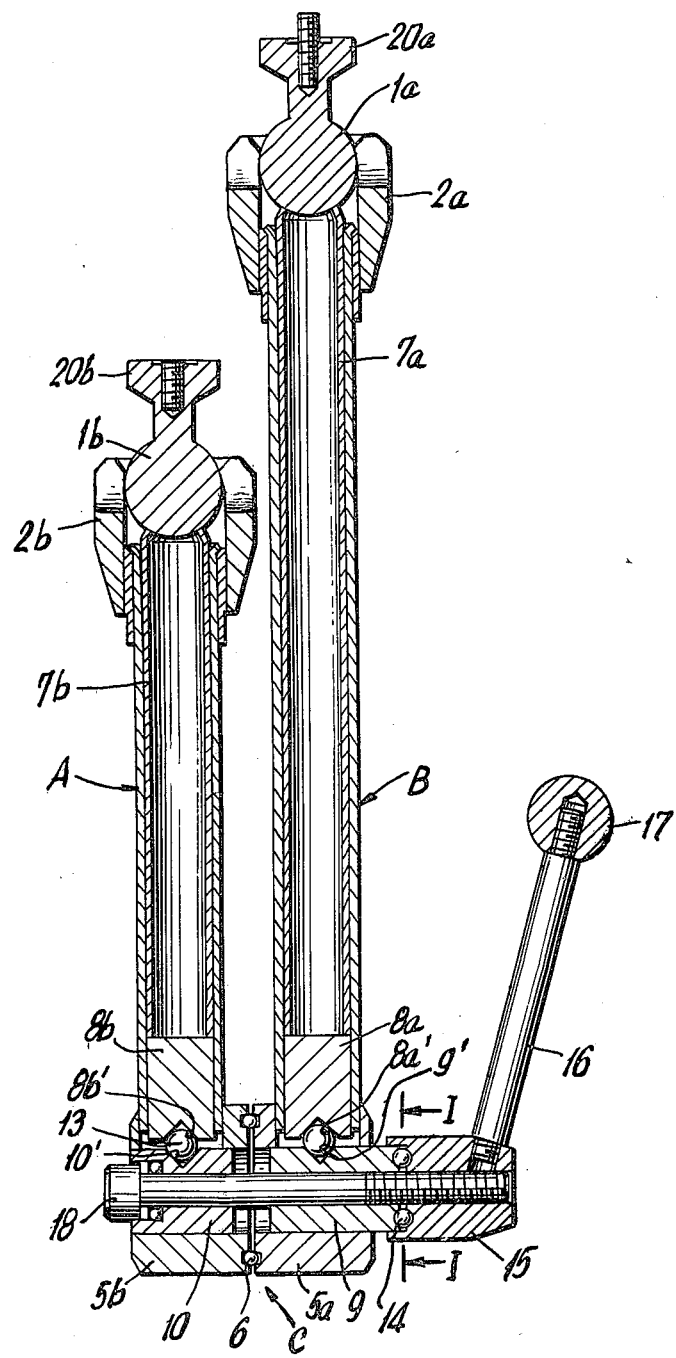
FIG. 1 is a sectional view taken through the arm portions and the joint members.

Referring to FIG. 1, the adjustable tripod arm according to the invention and the illustrated example consists of two arm portions A, B and an interposed joint member C for pivotal movement of the arms (arm arch joint C). The joint member and the two arm portions are held together by means of the axle 18 extending therethrough. Joint member C has two pivotally arranged joint halves 5a, 5b which are spaced apart by means of a locking ring 6. The locking ring 6 is placed in a groove of the joint halves and has a somewhat larger diameter than the corresponding grooves in the joint halves. The locking members 9, 10 and the locking sleeve 15 are arranged on the axle 18. The maneuvering handle composed of elements 16 and 17, serving for rotating the locking sleeve are screwed into the locking sleeve.

Spirally extending ball tracks 6a (FIGS. 3 and 4) in the locking member 9 and in the locking sleeve 15 result in a pressure when the locking sleeve is rotated. This pressure, on the one hand, presses the joint halves 5a,5b in the locking ring 6 and, on the other hand, over the balls 13, the slide members 8 and the pressure tube 7 presses the balls 1a, 1b against the sockets 2a, 2b.

Since the locking ring 6 has a somewhat larger diameter than the corresponding grooves in the joint halves 5a, 5b, the joint halves have the tendency to move apart when the pressure is released, however, the pressure on the balls 14 is maintained due to the increased friction in the grooves of the locking sleeve 15. The slide members 8a,8b in the arms A,B are on those sides which are directed toward the locking members 9, 10 provided with inclined stop faces 8a',8b'. The latter have corresponding surfaces in the locking members 9, 10, i.e., grooves with inclined stop faces 9',10' between which the balls 13 are arranged.

At their other ends, the arm portions A,B are provided with ball-and-socket joints which can be locked in any desired position and, for this reason, are provided with external locking members 20a, 20b and, in turn, again consist of the balls 1a, 1b and the sockets 2a, 2b. In use, locking members 20a and 20b are attached to the article, e.g., a camera, and the mounting member of a tripod respectively. By adjusting the position of locking members 20a and 20b and joint halves 5a and 5b, the camera or other article may be aimed and positioned in any desired way relative to the tripod. Handle 16 is then tightened to lock this position.

In the side view of FIG. 2, a partial section through the position of the locking or closing ring 6 is illustrated.

In FIG. 3, a section taken at I—I of FIG. 1 through the locking member 9 and the locking sleeve 15 is illustrated in order to show the spirally extending ball tracks 6a with the balls 14.

In FIG. 4, finally, a section taken at II—II of FIG. 3 is illustrated which shows the profiles of the spirally extending ball tracks 6a.

The method according to the present invention residing in locking means of ball tracks and balls, results in a coarse pitch and, thus, in a shorter rotational movement than in the conventional locking by means of a screw. This method is novel.

What is claimed is:

1. A device for adjustably mounting an article on a tripod comprising:

first and second arms connected by an interposed joint member, said joint member having two halves pivotally arranged adjacent one another on a common axle, one end of each of the first and second arms being attached to and extending from each of said halves, respectively;

connecting means at the unattached ends of each of the arms for adjustably connecting each of the arms to an article and a tripod, respectively;

means for pivotally positioning said joint halves and the attached arms about the axle and means for locking each of the connecting means and the joint halves in a fixed position.

2. The device of claim 1 comprising a joint including first and second juxtaposed joint halves arranged to be rotatable about a common axis relative to each other, two arm portions each extending at one end from a different one of said joint halves, connecting means arranged at the other ends of said arm portions for connecting said arm portions to respective objects, said connecting means being adjustable over a range of positions relative to the other ends of each of said arm portions, and means for locking said joint halves against rotation relative to each other and for locking said connecting means in fixed positions relative to the other ends of said arm portions.

3. The device of claim 1 or 2, wherein said locking means is arranged to lock said connecting means in said fixed positions before locking said joint halves against relative rotation.

4. The device of claim 1 or 2, wherein said connecting means comprises a pair of ball-and-socket joints each mounted at the other end of a corresponding one of said arm portions, and said locking means includes a pressure member extending within each of said arm portions for urging each ball against and in locking engagement with an associated socket of each of said ball-and-socket joints.

5. The device of claim 1 or 2 wherein said connecting means comprises a pair of ball-and-socket joints each mounted at the other end of a corresponding one of said arm portions, and said locking means includes a pressure member extending within each of said arm portions for urging each ball against and in locking engagement with an associated socket of each of said ball-and-socket joints, and wherein said locking means further includes an axle extending through said joint halves and which defines said common axis of rotation of said joint halves, and two locking members mounted on said axle for axially sliding movement for engaging said pressure members and urging said pressure members against the balls of said ball-and-socket joints when said locking means is actuated.

6. An adjustable arm for mounting on a tripod comprising two arm portions A, B and an interposed joint member C, wherein said joint member C has two joint halves 5a, 5b which are pivotally arranged next to each other on a common axle 18, extending therethrough and, by pressing said joint halves together in the direction of said axle, said joint member can be locked, and wherein said arm portions A, B are with their first ends fastened to their assigned joint halves 5a, 5b which are rotatable about the common axle 18 and, on their other ends, are provided with ball-and-socket joints 1a, 2a, 1b, 2b, which can be locked in any desired position and are provided with outer fastening members 20a, 20b, and wherein each arm portion A,B is provided with an influencing member 7a, 8a, 7b, 8b, arranged for locking said ball-and-socket joint of said arm 1a, 2a, 1b, 2b, said influencing member extending from said ball-and-socket joint to said joint half of said arm 5a, 5b and interacting with the locking member 9, 10 arranged in said joint half, characterized in that the bearing for each arm is formed by a locking member 9, 10 which is slidable in said joint half of said arm 5a, 5b along said axle 18 and is non-rotatable relative to said joint half, that, under the influence of said locking members over said inclined stop faces, each of said two locking members 9, 10 and each of said two influencing members is moved along said arm portions A, B into an end position when the locking members are moved towards each other in which end position said ball-and-socket joints are locked and said influencing members are prevented from further moving along said arm portions and in which said inclined stop faces of said locking members and said influencing members are still in a position in which force is transmitted relative to each other, so that upon a further movement toward each other, said locking members move said joint halves and press the latter together, so that said joint member is locked, and that the members for locking said joint member in a desired position consist of members 14–18 which ensure the axial movement of said locking members relative to each other.

7. The tripod arm of claim 6 wherein said members 14–18 for moving said locking members 9,10 relative to each other include helical surfaces (FIGS. 3 and 4) arranged at the outer end of at least one 9 of said two locking members which are movable relative to each other along said axle 18, said locking members being arranged in such a manner that they interact through said balls 14 with a slide surface of a sleeve 15 of one of said maneuvering members 15–17 arranged on said axle 18.

8. The tripod arm of claim 6 or 7, wherein said inclined stop faces of said locking members 9, 10 and of said influencing members 7a, 8a, 7b, 8b are formed by conical bores 9', 10', 8a', 8b' in said locking members and slide members 8a, 8b which form a portion of said influencing members, and that said stop faces formed by said conical bores are in a force-transmitting connection through the balls 13.

9. The tripod arm of claim 6 or 7, wherein a locking ring 6 is arranged in a conical groove between said joint halves 5a, 5b wherein the diameter of said locking ring is somewhat larger than the corresponding grooves in said joint halves (FIG. 2).

* * * * *